(12) United States Patent
Numata et al.

(10) Patent No.: US 9,363,485 B2
(45) Date of Patent: Jun. 7, 2016

(54) VEHICLE DRIVING ASSIST DEVICE

(75) Inventors: Yusuke Numata, Kawasaki (JP); Shinsuke Tachibana, Kirishima (JP)

(73) Assignee: KYOCERA Corporation, Kyoto (JP)

( * ) Notice: Subject to any disclaimer, the term of this patent is extended or adjusted under 35 U.S.C. 154(b) by 307 days.

(21) Appl. No.: 13/982,245

(22) PCT Filed: Jan. 27, 2012

(86) PCT No.: PCT/JP2012/051872
§ 371 (c)(1),
(2), (4) Date: Jul. 26, 2013

(87) PCT Pub. No.: WO2012/102392
PCT Pub. Date: Aug. 2, 2012

(65) Prior Publication Data
US 2013/0307985 A1    Nov. 21, 2013

(30) Foreign Application Priority Data

Jan. 27, 2011   (JP) ................................. 2011-015807

(51) Int. Cl.
| | |
|---|---|
| *H04N 7/18* | (2006.01) |
| *B60R 1/00* | (2006.01) |
| *G08G 1/16* | (2006.01) |
| *B62D 15/02* | (2006.01) |

(52) U.S. Cl.
CPC .. *H04N 7/18* (2013.01); *B60R 1/00* (2013.01); *B62D 15/029* (2013.01); *G08G 1/168* (2013.01); *B60R 2300/305* (2013.01)

(58) Field of Classification Search
CPC ................. B60R 1/00; B60R 2300/305; B60R 2300/307; B60R 2300/806; B62D 15/0275
USPC ........................................................... 348/148
See application file for complete search history.

(56) References Cited

U.S. PATENT DOCUMENTS

| | | | | |
|---|---|---|---|---|
| 6,411,867 B1 * | 6/2002 | Sakiyama | .............. | B60Q 9/005 340/901 |
| 2001/0030688 A1 * | 10/2001 | Asahi | ..................... | B60Q 9/005 348/118 |

(Continued)

FOREIGN PATENT DOCUMENTS

| | | |
|---|---|---|
| JP | 2000-280822 A | 10/2000 |
| JP | 2002-362270 A | 12/2002 |

(Continued)

OTHER PUBLICATIONS

International Search Report; PCT/JP2012/051872; May 1, 2012.
Written Opinion of the International Searching Authority; PCT/JP2012/051872; May 1, 2012.
An Office Action; "Notice of Reasons for Rejection," issued by the Japanese Patent Office on Mar. 4, 2014, which corresponds to Japanese Patent Application No. 2012-554872 and is related to U.S. Appl. No. 13/982,245; with English language concise explanation.

*Primary Examiner* — Sath V Perungavoor
*Assistant Examiner* — Nathnael Aynalem
(74) *Attorney, Agent, or Firm* — Studebaker & Brackett PC

(57) ABSTRACT

Provided is a vehicle driving assist device which can clearly display superimposing guide lines on an image captured from the surrounding area of a vehicle without increasing the areas of the superimposing lines. The vehicle driving assist device displays an image captured from the surrounding area of a vehicle on a vehicle monitor. The vehicle driving assist device comprises: an imaging unit mounted in a vehicle for capturing the image from the surrounding area of the vehicle; and an image processing unit for displaying superimposing guide lines on the image output from the imaging unit. The image processing unit displays the guide lines in a manner such that colors are periodically altered in the length directions thereof and displayed.

15 Claims, 8 Drawing Sheets

(56) References Cited

U.S. PATENT DOCUMENTS

| | | | |
|---|---|---|---|
| 2006/0287826 A1* | 12/2006 | Shimizu | B60K 35/00 701/431 |
| 2010/0070139 A1* | 3/2010 | Ohshima | B60R 1/00 701/42 |
| 2011/0069169 A1 | 3/2011 | Kadowaki et al. | |
| 2011/0181724 A1 | 7/2011 | Kadowaki et al. | |

FOREIGN PATENT DOCUMENTS

| | | |
|---|---|---|
| JP | 2009-126353 A | 6/2009 |
| JP | 2009-232331 A | 10/2009 |
| JP | 2010-001020 A | 1/2010 |
| JP | 2010-018102 A | 1/2010 |
| JP | 2010-136289 A | 6/2010 |

* cited by examiner

| PATTERN NUMBER | REFERENCE COLOR | | OPPOSITE COLOR | |
|---|---|---|---|---|
| | COLOR | BRIGHTNESS (%) | COLOR | BRIGHTNESS (%) |
| 1 | YELLOW | 80 | BLUE | 20 |
| 2 | RED | 70 | GREEN | 20 |
| 3 | ORANGE | 60 | BLUE-GREEN | 30 |
| 4 | MAGENTA | 50 | YELLOW-GREEN | 30 |

VEHICLE DRIVING ASSIST DEVICE

TECHNICAL FIELD

The present invention relates to a vehicle driving assist device, and more specifically, to a vehicle driving assist device that displays an image, which is captured from a surrounding area of a vehicle, on a monitor in a vehicle and also displays a guide line for assisting a vehicle driving with being superimposed on the captured image.

BACKGROUND ART

A driving assist device has been used, which displays an image that is captured from a surrounding area of a vehicle with an on-vehicle camera on an in-vehicle monitor. A driver drives the vehicle while seeing the captured image displayed on the in-vehicle monitor, so that the driver can recognize an obstacle in the surrounding area of the vehicle. Also, when parking the vehicle, the driver can correctly and easily park the vehicle in a parking zone.

As an applied technology of the driving assist device, the other image for assisting the vehicle driving is displayed with being superimposed on a vehicle rear image, in addition to the captured image of the surrounding area of the vehicle captured with the on-vehicle camera.

In general, a device has been known, which displays vehicle driving course expecting guide lines with being superimposed on the captured image so as to easily recognize a distance between the vehicle and an object or a horizontal width.

For example, JP-A-2010-1020 discloses a device that displays parking frame lines, which indicate a parking space, with being superimposed on a vehicle rear image and adds and displays a side surface part or shadow part to an index line. Thereby, a color area of the index line is increased, so that it is possible to easily recognize the index line.

SUMMARY OF THE PRESENT INVENTION

Problems to be Solved

However, when the shading part or adjacent side surface part of the guide line is displayed with being superimposed, an occupying area of the guide line drawn on the captured image is increased. Thereby, an area in which a vehicle surrounding image such as road surface and landscape to be projected on the captured image is hidden is increased. The captured image is important information for a driver, and hiding the captured image is not preferable. Also, an area of the guide line is preferable as small as possible within a clearly recognizable range.

Therefore, an object of the present invention is to provide a vehicle driving assist device that can display a superimposing guide line, which can be clearly recognized, on an image captured from a surrounding area of a vehicle without increasing an area of the superimposing guide line.

Means for Solving the Problem

In order to achieve the above object, according to an aspect of a vehicle driving assist device of the present invention, a vehicle driving assist device that displays an image captured from a surrounding area of a vehicle on an in-vehicle monitor includes: an imaging unit that is mounted on the vehicle and captures an image from a surrounding area of the vehicle; and an image processing unit that displays a guide line with being superimposed on the captured image output from the imaging unit, wherein the image processing unit displays so that a color of the guide line is periodically altered in a length direction thereof.

According to the above aspect, the color of the guide line that is displayed with being superimposed on the captured image is altered, so that two or more colors are periodically arranged. Thereby, it is possible to superimposedly display the guide line that can be clearly recognized, without being swayed by color tones or shapes of the captured image. Specifically, regarding a monochromatic guide line, it is difficult for a color vision-impaired person to recognize the guide line by a brightness or hue of a background. However, two or more colors are used, like the present invention, so that the color vision-impaired person can recognize any one color without fail. Also, in the present invention, the color of the guide line is altered in the length direction thereof. Therefore, it is possible to make that a width of the guide line is the same as that of the guide line of the related art, which is monochromatically displayed, and to make an image display in which it is possible to easily recognize both the captured image and the guide line without increasing an area of the superimposed image.

Also, the guide line may have at least a first color part and a second color part, and the first color part and the second color part may adjacent to each other in the length direction of the guide line.

Also, hues of the first color part and the second color part adjacent to each other may have a complementary color relation.

Accordingly, the hues of the colors adjacent to each other in the length direction have a complementary color relation, so that the adjacent colors have a synergetic effect of making the colors remarkable. As a result, the guide line can be more clearly recognized. Specifically, the guide line is efficient for a color vision-impaired person, so that it is possible to further improve the recognition accuracy of the guide line.

Also, the first color part and the second color part adjacent to each other may have the substantially same hue and may also have different shadings. Thereby, it is possible to superimposedly display the guide line that can be clearly recognized, without being swayed by the color tones of the captured image.

The first color part and the second color part may have a filling part and a frame line part, respectively, and the filling part and the frame line part may have different chroma. Thereby, it is possible to superimposedly display the guide line that can be more clearly recognized, without being swayed by the color tones of the captured image.

The image processing unit may make lengths of the first color part and the second color part longer as a spatial frequency of the captured image is higher. Thereby, even when the spatial frequency is high, it is possible to superimposedly display the guide line that can be clearly recognized because the lengths of the first color part and second color part are lengthened.

The image processing unit may be configured not to periodically alter colors of the first color part and the second color part when a spatial frequency of the captured image is high. Thereby, when the spatial frequency is high, since the guide line is displayed as a uniform line, it is possible to superimposedly display the guide line that can be clearly recognized.

The image processing unit may display the guide line over a far side from a vehicle side, and the image processing unit may make lengths of the first color part and the second color part at the vehicle side shorter than lengths of the first color part and the second color part at the far side. The spatial frequency is generally high at the far side in the captured image. However, accordingly, since the length of the period of the color alternation at the far side is lengthened, it is possible to superimposedly display the guide line that can be clearly recognized.

The image processing unit may display the guide line over a far side from a vehicle side, and the image processing unit may make lengths of the first color part and the second color part at the vehicle side longer than lengths of the first color part and the second color part at the far side. Thereby, since the length of the period of the color alternation at the far side is shortened, the driver can easily recognize the guide line with a natural sense of perspective.

The first color part and the second color part adjacent to each other may have different hues, and the image processing unit may display so that shadings of the first color part and the second color part are periodically altered, respectively. Thereby, it is possible to superimposedly display the guide line that can be more clearly recognized, without being swayed by the color tones of the captured image.

The image processing unit may display the guide line over a far side from a vehicle side, and the image processing unit may make a brightness of the guide line at the vehicle side higher than a brightness of the guide line at the far side. Thereby, even when the brightness at the vehicle side is low, it is possible to superimposedly display the guide line that can be more clearly recognized.

Also, a storage unit, which stores a plurality of color-combination patterns configured by combinations of colors of the guide line, is further provided. The image processing unit may include a color-combination pattern selection unit that selects a color-combination pattern from the storage unit, and a color-combination pattern setting unit that sets, as a color-combination pattern of the guide line, the color-combination pattern selected in the color-combination pattern selection unit.

Accordingly, a color-combination pattern of the guide line can be selected from the plurality of color-combination patterns preset in the storage unit, so that it is possible to display a guide line that can be most easily recognized by each driver.

Also, the image processing unit may include a brightness selection unit that selects a brightness of the guide line, and a brightness setting unit that sets, as a brightness of the guide line, the brightness selected in the brightness selection unit.

Accordingly, a brightness of the guide line can be selected, so that it is possible to display a guide line that can be most easily recognized by each driver.

Also, the image processing unit may include a color attribute detection unit that detects at least one of a hue and a brightness of the captured image area on which the guide line is superimposed, and a color-combination pattern setting unit or brightness setting unit that compares the at least one of the hue and the brightness between the captured image area and the guide line, and when there is a part in which the at least one of the hue and the brightness are identical or approximate, changes at least one of the color-combination pattern of the guide line and the brightness of the guide line in the part in which the at least one of the hue and the brightness are identical or approximate.

Accordingly, when the at least one of the hue and the brightness of the captured image area and the guide line are identical or approximate, the color-combination pattern or brightness of the guide line is changed, so that it is possible to display a guide line that can be most easily recognized, irrespective of the colors of the captured image.

In the meantime, the part in which the color-combination pattern or brightness of the guide line is changed may be a part of the guide line or an entire thereof.

Even with the vehicle driving assist device, it is possible to superimposedly display the guide line that can be clearly recognized, without being swayed by the color tones or shapes of the captured image.

Also, according to another aspect of a vehicle driving assist device of the present invention, a vehicle driving assist device that displays an image captured from a surrounding area of a vehicle on an in-vehicle monitor includes an image acquisition unit that acquires an image captured from the surrounding area of the vehicle, and an image processing unit that displays a guide line with being superimposed on the captured image output from the image acquisition unit, wherein the image processing unit displays the guide line so that a color thereof is periodically altered in a length direction thereof.

Even with the vehicle driving assist device, it is possible to superimposedly display the guide line that can be clearly recognized, without being swayed by the color tones or shapes of the captured image.

Meanwhile, according to another aspect of a vehicle driving assist device of the present invention, a vehicle driving assist device that displays an image captured from a surrounding area of a vehicle on an in-vehicle monitor includes: an imaging unit that is mounted on the vehicle and captures an image from a surrounding area of the vehicle; an image processing unit that displays a guide line with being superimposed on the captured image output from the imaging unit; and a color attribute detection unit that detects at least one of a hue and a brightness of the captured image area on which the guide line is superimposed, wherein the image processing unit compares the at least one of the hue and the brightness between the captured image area and the guide line, and when there is a part in which the at least one of the hue and the brightness are identical or approximate, the image processing unit changes a color of the guide line in the part in which the at least one of the hue and the brightness are identical or approximate.

Even with the vehicle driving assist device, it is possible to superimposedly display the guide line that can be clearly recognized, without being swayed by the color tones or shapes of the captured image.

Effects of the Present Invention

According to the present invention, the color of the guide line that is displayed with being superimposed on the captured image is altered, so that two or more colors are periodically arranged. Thereby, it is possible to superimposedly display the guide line that can be clearly recognized, without being swayed by color tones or shapes of the captured image. Specifically, regarding a monochromatic guide line, it is difficult for a color vision-impaired person to recognize the guide line by a brightness or hue of a background. However, two or more colors are used, like the present invention, so that the color vision-impaired person can recognize any one color without fail. Also, in the present invention, the color of the guide line is altered in the length direction thereof. Therefore, it is possible to make a width of the guide line become the same as that of the guide line of the related art, which is monochromatically displayed, and to make an image display in which it is possible to easily recognize both the captured image and the guide line without increasing an area of the superimposed image.

PREFERRED ILLUSTRATIVE EMBODIMENTS OF THE PRESENT INVENTION

Hereinafter, a preferred illustrative embodiment of the present invention will be specifically described with reference to the drawings. The shapes and the like of constitutional parts described in the illustrative embodiment are not intended to limit the scope of the present invention and are simply illustrative examples.

Figure 1:
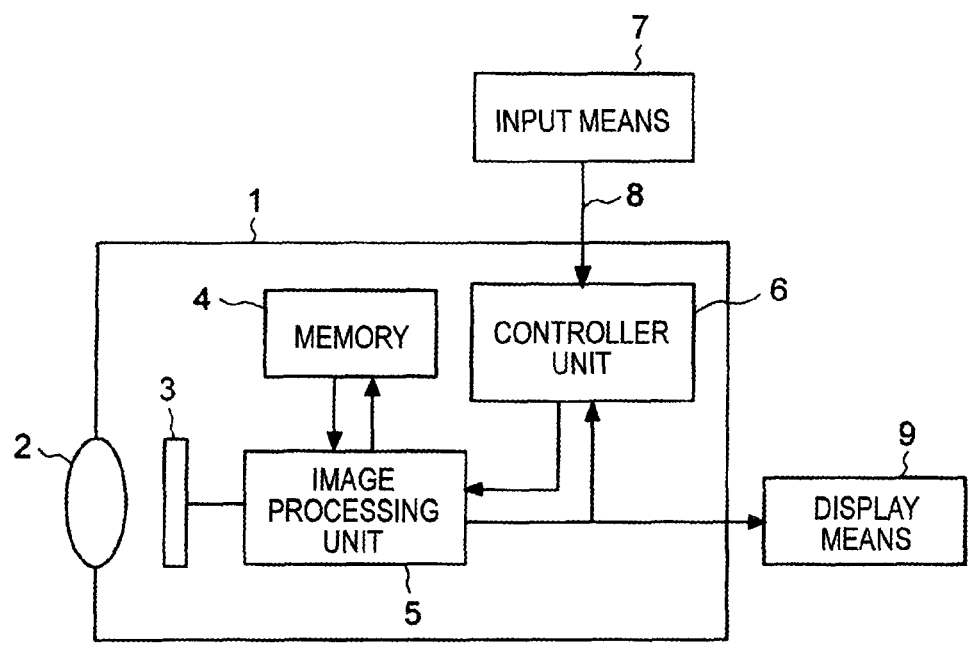
FIG. 1 is a block diagram illustrating a configuration of a vehicle driving assist device according to an illustrative embodiment of the present invention and a peripheral device thereof.

First, a configuration of a vehicle driving assist device according to an illustrative embodiment of the present invention is described with reference to FIG. 1. Here, FIG. 1 is a block diagram illustrating a configuration of a vehicle driving assist device according to an illustrative embodiment of the present invention and a peripheral device thereof.

A vehicle driving assist device 1 according to an illustrative embodiment of the present invention mainly has an imaging optical system 2, an imaging unit 3, a memory (storage unit) 4, an image processing unit 5 and a controller unit 6.

The imaging optical system 2 is an optical member that makes a light (i.e., an optical image of a surrounding area of a vehicle) be incident onto the imaging unit 3. Specifically, the imaging optical system includes one or plural lenses. Also, the imaging optical system 2 may have other optical members such as filter and the like, in addition to a lens. The plural optical members are arranged so that optical axes thereof coincide.

The imaging unit 3 is mounted on a vehicle and captures an image of a surrounding area of the vehicle through the imaging optical system 2. An imaging device that converts an optical image formed on the imaging optical system 2 into an electrical signal, such as a CCD sensor, a CMOS sensor and the like are used. In the meantime, an A/D converter (not shown) that converts an analog output of the imaging unit 3 into a digital signal is provided between the imaging unit 3 and the image processing unit 5.

The memory 4 mainly stores a color-combination pattern of a guide line, a captured image and a guide line image. Here, the guide line is displayed with being superimposed on a captured image so as to assist vehicle driving, and for example, includes a guide line indicating a vehicle driving course expecting trajectory, a guide line indicating a distance from a vehicle, a guide line indicating a vehicle width, and the like. In the meantime, the guide line may be linear or curved. Also, the guide line may be previously stored in the memory 4 or may be altered depending on vehicle behaviors such as a steering angle of a vehicle, a difference between rotating speeds of left and right wheels, a vehicle speed and the like.

The controller unit 6 mainly outputs a command signal of a guide line image superimposed on a captured image and acquires an input signal from an input means 7 and sensor signals from a variety of sensors of the vehicle. In the meantime, the input means 7 is provided in the vicinity of a driver seat and inputs various input signals and includes a keyboard, a touch panel and the like, for example. Also, the input signal from the input means 7 is transmitted to the controller unit 6 via a line 8. The line 8 may be a network in the vehicle such as CAN (Controller Area Network) or a dedicated line.

The image processing unit 5 and the controller unit 6 are configured by an MPU, an LSI and the like, for example. The image processing unit 5 superimposes a guide line on a captured image output from the imaging unit 3 and outputs a generated image to a display means 9 such as in-vehicle monitor.

The image processing unit 5 is configured to display the guide line to be superimposed on the captured image so that a color is periodically altered and displayed in a length direction thereof.

Figure 2:
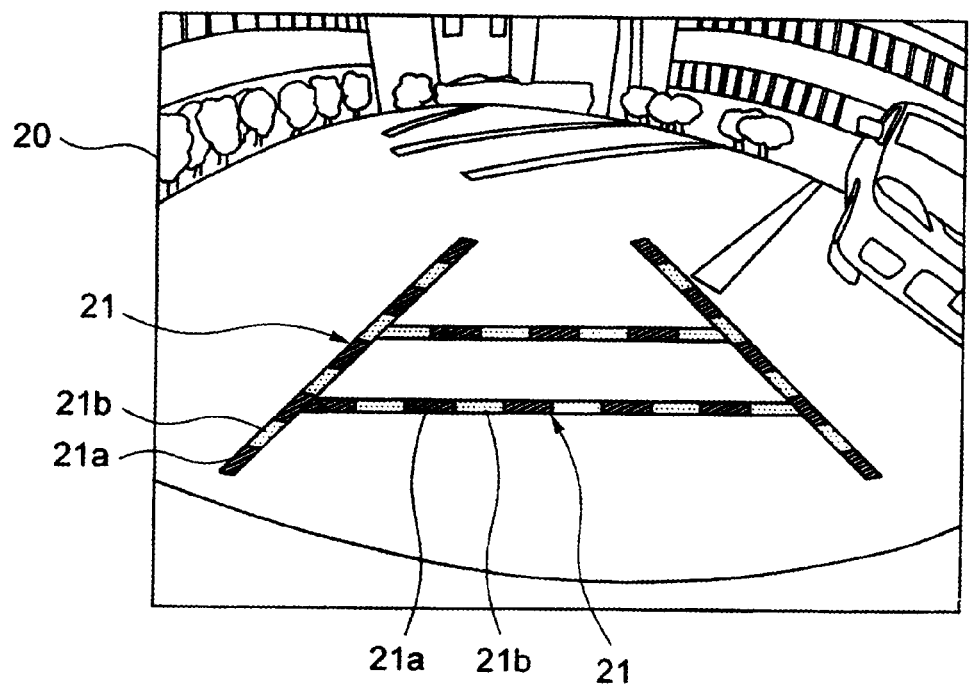
FIG. 2 is a view illustrating a display image in which two-color guide lines are superimposed on a captured image.
Figure 3:
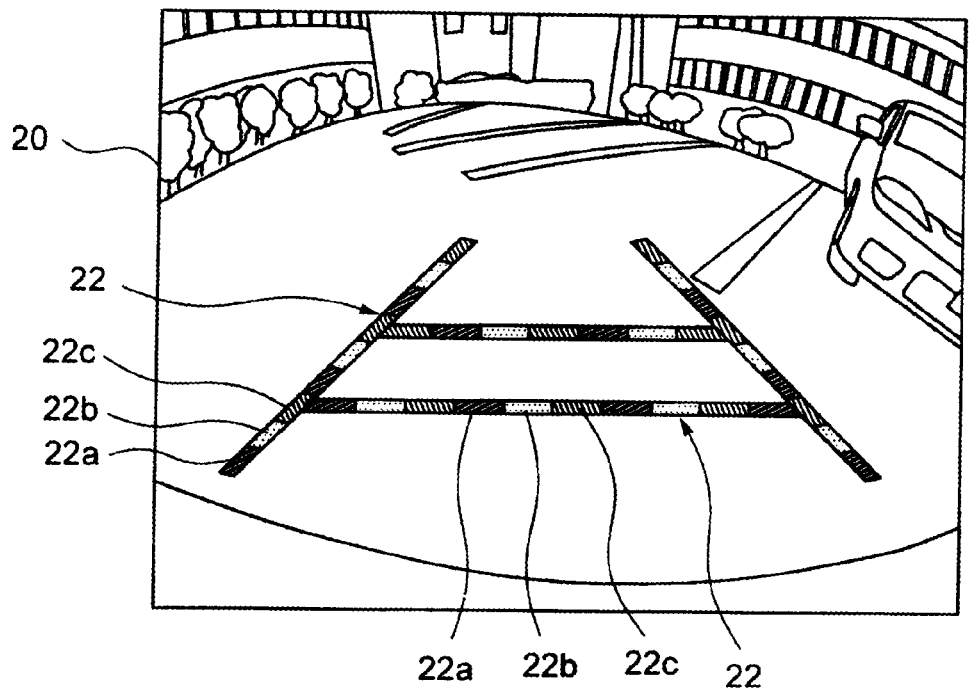
FIG. 3 is a view illustrating a display image in which three-color guide lines are superimposed on a captured image.

Referring to FIGS. 2 and 3, an example of a display image in which guide lines are superimposed on a captured image is described. Meanwhile, in FIGS. 2 and 3, for example, a guide line indicating a vehicle driving course expecting trajectory that is drawn in a vehicle forwarding direction (a direction inclined relative to a vertical direction of the sheet) and a guide line indicating a vehicle width that is drawn in a vehicle width direction (a horizontal direction of the sheet) of a vehicle are shown.

FIG. 2 is a view illustrating a display image in which two-color guide lines are superimposed on a captured image. In the display image, guide lines 21 are displayed with being superimposed on a captured image 20, and the guide lines 21 are color-combined so that a color 21a (an example of the first color part) and a color 21b (an example of the second color part) are alternately displayed in length directions thereof.

FIG. 3 is a view illustrating a display image in which three-color guide lines are superimposed on a captured image. In the display image, guide lines 22 are displayed with being superimposed on a captured image 20. The guide lines 22 are color-combined so that a color 22a, a color 22b and a color 22c are periodically displayed in length directions thereof.

Meanwhile, in FIG. 2, one color is discontinuously altered with respect to the other color. However, they may be color-combined so that one color is continuously altered with respect to the other color.

According to this illustrative embodiment, the colors of the guide lines that are displayed with being superimposed on the captured image are altered, so that two or more colors are periodically arranged. Thereby, it is possible to superimposedly display the guide lines that can be clearly recognized, without being swayed by color tones or shapes of the captured image. Specifically, regarding a monochromatic guide line, it is difficult for a color vision-impaired person to recognize the guide line according to a brightness or hue of a background. However, in this illustrative embodiment, two or more colors are used, so that the color vision-impaired person can recognize any one color without fail. Also, in this illustrative embodiment, the colors of the guide lines are altered in the length directions thereof. Therefore, it is possible to make a width of the guide line be the same as that of the guide line of the related art, which is monochromatically displayed, and to make an image display in which it is possible to easily recognize both the captured image and the guide line without increasing an area of the superimposed image.

Also, in this illustrative embodiment, it is preferable that the guide line has hues of the colors adjacent to each other having a complementary color relation in the length direction thereof.

Figure 4:
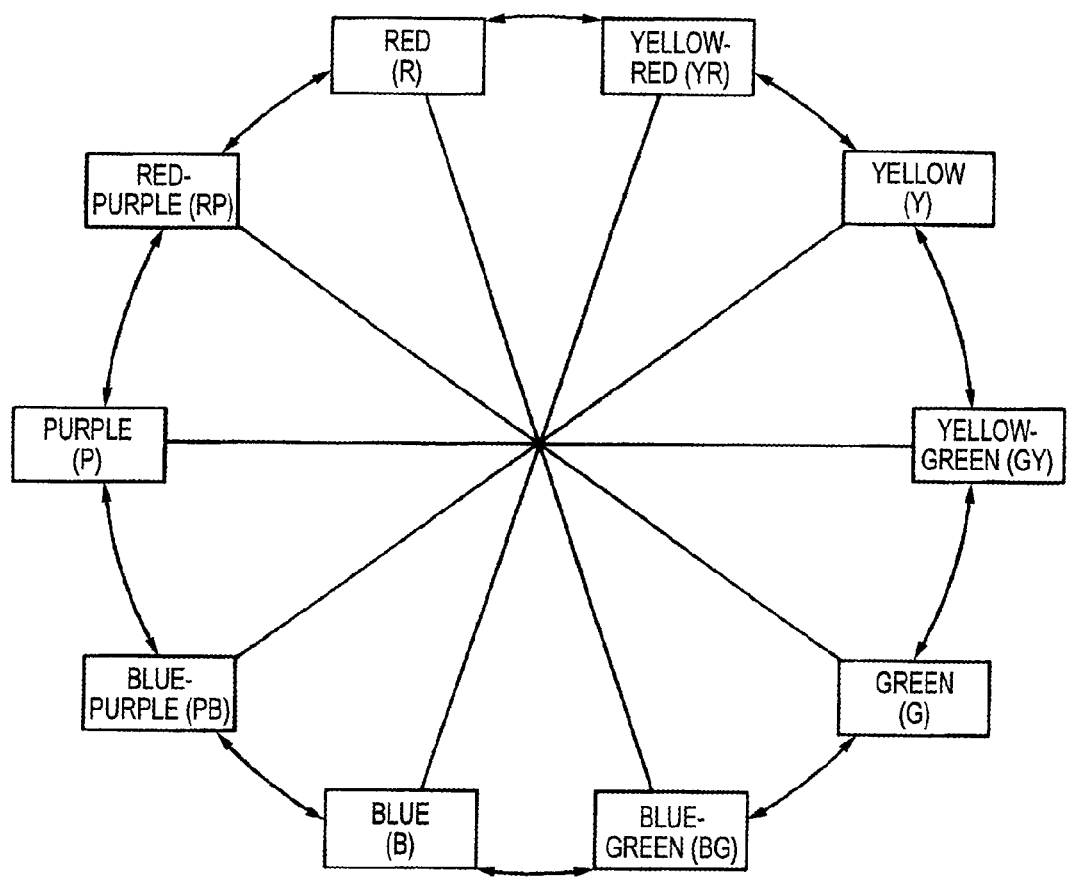
FIG. 4 is a view illustrating a Munsell hue circle.

Here, the complementary color relation is a relation that colors are oppositely positioned on a hue circle. In order to select hues having a complementary color relation, a Munsell hue circle shown in FIG. 4 may be used, for example. The Munsell hue circle is a hue circle that is divided into ten colors of five basic colors (red, yellow, green, blue and purple) and intermediate colors thereof (yellow-red, yellow-green, blue-green, blue-purple and red-purple) and the colors are further divided therebetween and are arranged in a circular shape.

With the above hue circle, the hues being exactly oppositely positioned are selected such as a combination of red and blue-green, a combination of yellow-red and blue and a combination of yellow and blue-purple. At this time, regarding a hue of an adjacent color, the hue may be preferably located at a position close to the exact opposite even though it is not exactly oppositely positioned on the hue circle. For example, a combination of red and green, a combination of red and blue and the like may be possible. Meanwhile, in the below descriptions, the substantially same hue includes a color adjacent to any color on the Munsell hue circle shown in FIG. 4, for example.

In the meantime, when selecting hues having a complementary color relation, the other hue data may be also used.

Accordingly, the hues of the colors adjacent to each other in the length direction have a complementary color relation, so that the adjacent colors have a synergetic effect to be highlighting the colors. As a result, the guide lines can be clearly recognized. Specifically, the guide lines are efficient for a color vision-impaired person, so that it is possible to further improve the recognition accuracy of the guide lines. In the meantime, the guide line may be configured so that shadings of the adjacent colors in the length direction thereof are different. The shading of the color is based on any one or both of the brightness and the chroma.

Figure 5:
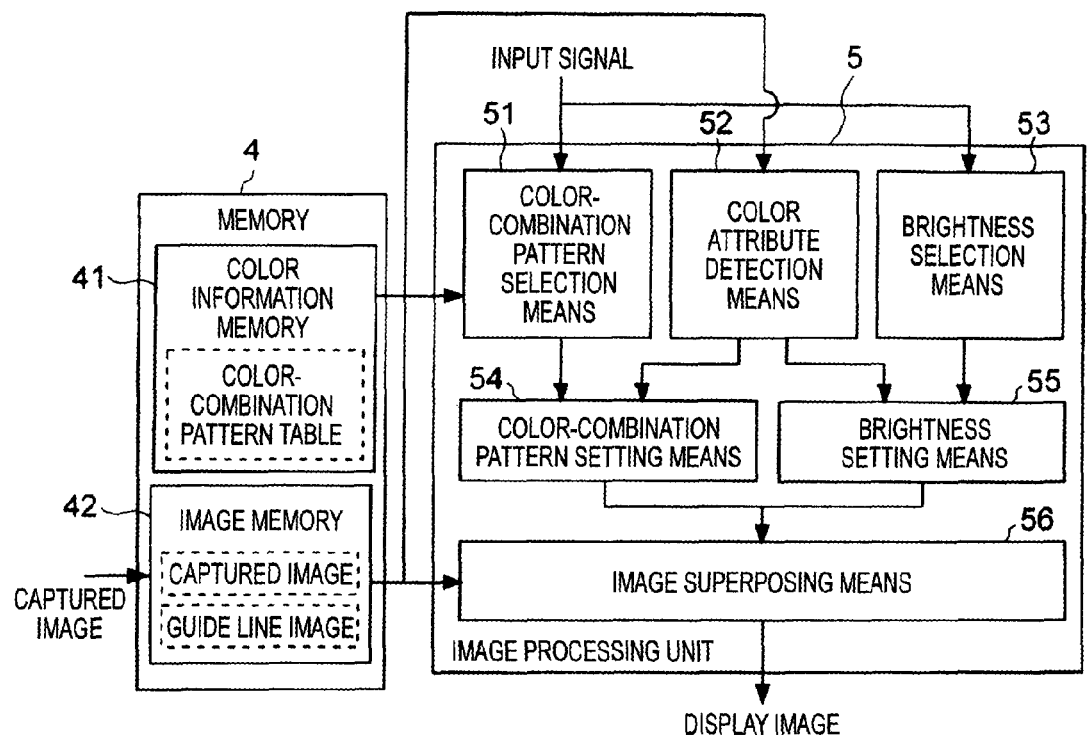
FIG. 5 is a block diagram illustrating an example of a specific configuration of an image processing unit and a memory in an illustrative embodiment of the present invention.

Here, a specific configuration example of the image processing unit and the memory of the illustrative embodiment of the present invention is specifically described with reference to FIG. 5.

The memory 4 includes a color information memory 41 and an image memory 42.

Figures 6, 7:
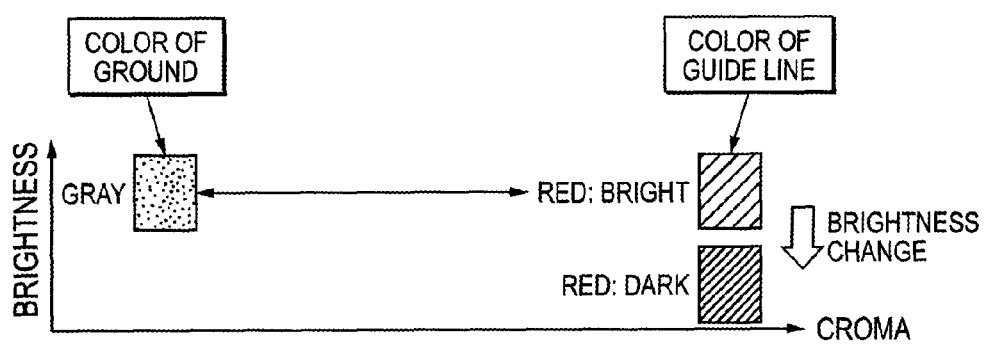
FIG. 6 is a view illustrating an example of a color-combination pattern table.
FIG. 7 is a view illustrating a method of setting a brightness.

The color information memory 41 stores a color-combination pattern table of the guide lines. An example of the color-combination pattern table is shown in FIG. 6. In the color-combination pattern table, a plurality of color-combination patterns configured by combinations of colors of guide lines is stored and is denoted with a pattern number, respectively. For example, a pattern number 1 is configured by a combination of yellow that is a reference color and blue that is an opposite color. Also, the reference color and the opposite color may be set with brightness, respectively.

The image memory 42 stores an image captured in the imaging unit 3 and a guide line image.

The image processing unit 5 includes a color-combination pattern selection means 51, a color attribute detection means 52, a brightness selection means 53, a color-combination pattern setting means 54, a brightness setting means 55 and an image superimposing means 56.

The image superimposing means 56 performs processing of superimposing a guide line on a captured image. In the meantime, a configuration of superimposing a guide line after setting a color-combination pattern or brightness of a guide line is here described. However, a configuration of superimposing a guide line on a captured image and then again setting a color-combination pattern or brightness may be also possible.

The color-combination pattern selection means 51 selects a color-combination pattern from the color information memory 41 in response to an input signal from the input means 7.

The color attribute detection means 52 detects a hue or brightness of a captured image area on which a guide line is superimposed. In the meantime, the color attribute detection means 52 may additionally detect a color shading. The brightness selection means 53 selects a brightness of a guide line in response to an input signal from the input means.

In the meantime, the image processing unit 5 may change a color-combination pattern or brightness of a guide line depending on a spatial frequency of a captured image. Here, the spatial frequency indicates a spatial period. The high spatial frequency means that there is much spatial change in a captured image.

The color-combination pattern setting means 54 sets, as a color-combination pattern of a guide line, the color-combination pattern selected in the color-combination pattern selection means 51, or compares a hue or brightness of the captured image area detected in the color attribute detection means 52 and a hue or brightness of the guide line. When there is a part in which the hues or brightness are identical or approximate, the color-combination pattern setting means changes the color-combination pattern of the guide line at least in the part in which the hues or brightness are identical or approximate.

The brightness setting means 55 sets, as brightness of a guide line, the brightness selected in the brightness selection means 53, or compares a hue or brightness of the captured image area detected in the color attribute detection means 52 and a hue or brightness of the guide line. When there is a part in which the hues or brightness are identical or approximate, the brightness of the guide line is changed at least in the part in which the hues or brightness are identical or approximate.

As shown in FIG. 7, for example, when a part projected on a captured image is gray, a color of a guide line is red and the brightness of the colors of the part and the guide line is identical, the brightness setting means 55 changes only the brightness of the guide line while keeping the hue and chroma in the same. Here, the bright red having high brightness is changed to the dark red having low brightness.

Figure 8:
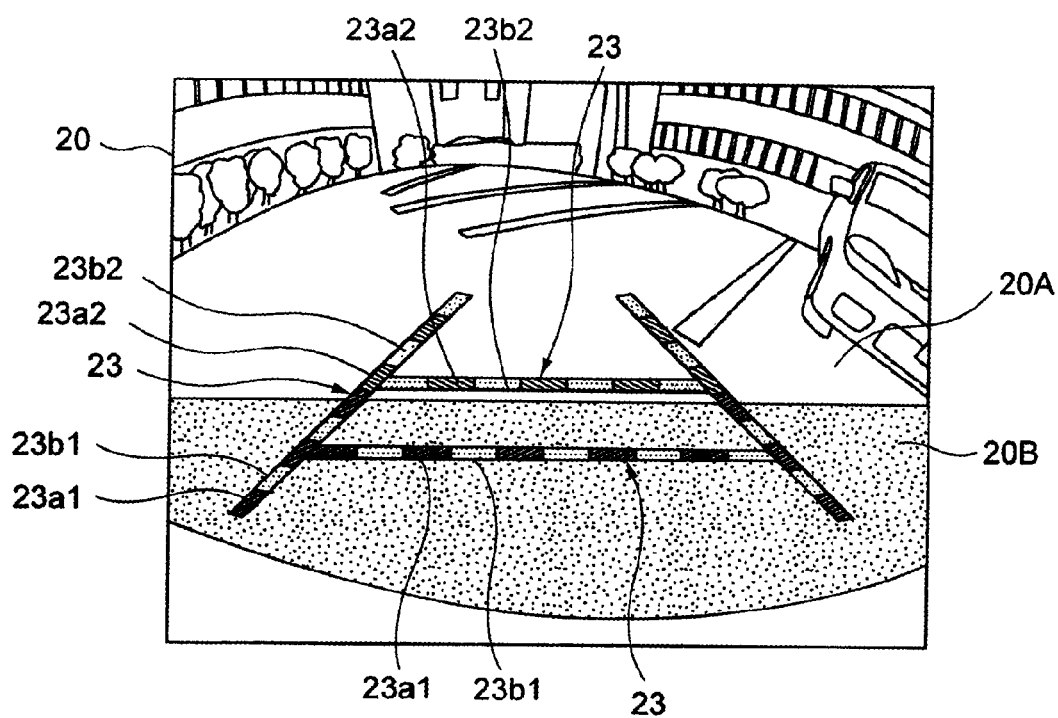
FIG. 8 is a view illustrating a display image in which two-color guide lines having color-combination patterns, which are made to be different depending on shading of a captured image, are superimposed on a captured image.

FIG. 8 is a view illustrating a display image in which two-color guide lines having color-combination patterns, which are made to be different depending on shading of a captured image, are superimposed on a captured image. The captured image 20 has a sunny place 20A that is positioned at a far side (upper in the sheet) from a vehicle and a shady place 20B that is positioned at a near side (lower in the sheet) to the vehicle. In this case, when the color attribute detection means 52 detects a hue or brightness of the captured image area in which the guide lines are displayed with being superimposed, there is different brightness between the sunny place 20A and the shady place 20B. Therefore, the color-combination pattern setting means 54 sets so that the color-combination patterns are different between a part of the guide line 23 superimposed on the sunny place 20A and a part of the guide line 23 superimposed on the shady place 20B. Here, the guide line 23 superimposed on the sunny place 20A is displayed with a color-combination of a color 23a2 and a color 23b2, and the guide line 23 superimposed on the shady place 20B is displayed with a color-combination of a color 23a1 and a color 23b1.

Accordingly, the color-combination pattern or brightness of the guide line 23 may be made to be partially different on one guide line 23.

As described above, it is possible to select the color-combination pattern or brightness of the guide line, so that it is possible to display a guide line that can be most easily recognized by each driver.

Also, when the captured image part and the guide line are identical or approximate with respect to the hue or the brightness, the color-combination pattern or brightness of the guide line is changed, so that it is possible to always display a guide line that can be most easily recognized, irrespective of the colors of the captured image.

Figure 9:
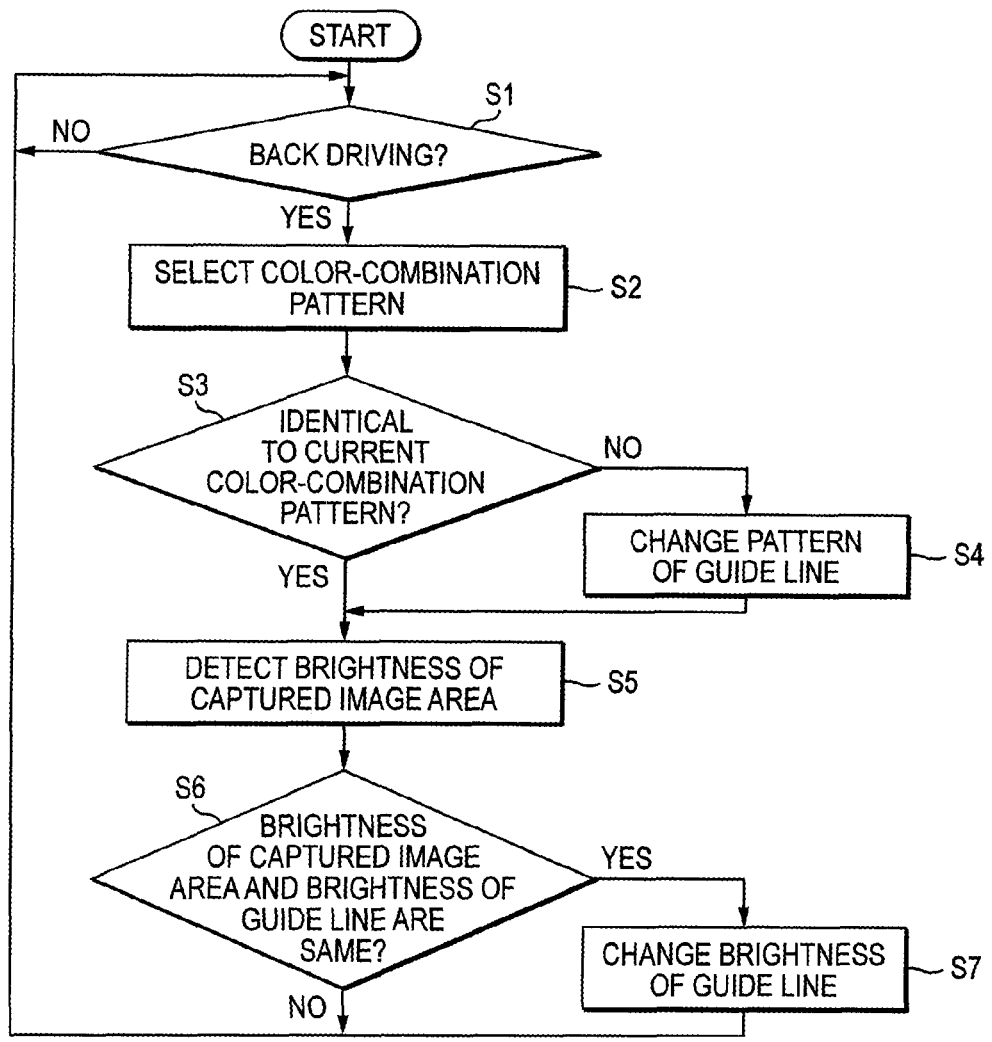
FIG. 9 is a flow chart illustrating an example of processing performed in the vehicle driving assist device according to an illustrative embodiment of the present invention.

In the below, an example of processing of the driving assist device according to an illustrative embodiment of the present invention is described with reference to a flowchart shown in FIG. 9.

First, in step S1, the controller unit 6 acquires a position of a shift lever from a shift position detection sensor mounted on the vehicle and determines from the shift position whether the vehicle is being driving at the moment. When it is determined that the vehicle is being driving, the color-combination pattern selection means 51 selects a color-combination pattern from the color information memory 41, based on an input signal acquired through the line 8, in step S2. Then, in step S3, the color-combination pattern setting means 54 determines whether the selected color-combination pattern is the same as the currently set color-combination pattern. When the patterns are different, the color-combination pattern of the guide line is changed in step S4.

When the selected color-combination pattern is the same as the currently set color-combination pattern or after the pattern of the guide line is changed in step S4, the color attribute detection means 52 detects the brightness of the captured image area on which the guide lines are superimposed, in step S5. Then, in step S6, the brightness setting means 55 determines whether the detected brightness of the captured image area is identical or approximate to the preset brightness of the guide line. When the brightness of the captured image area is not identical or approximate to the brightness of the guide line, the processing returns to step S1 while keeping the setting as it is. On the other hand, when the brightness of the captured image area is identical or approximate to the brightness of the guide line, the brightness of the guide line is changed in step S7, and then the processing returns to step S1.

Meanwhile, in the above illustrative embodiment, the hues of the colors (the first color part/the second color part) adjacent to each other in the length direction have the complementary color relation. Thereby, the guide lines that can be clearly recognized are displayed with being superimposed. However, the first color part and the second color part adjacent to each other may have the substantially same hue and different shadings. Also in this case, it is possible to superimposedly display the guide lines that can be clearly recognized, without being swayed by the color tones of the captured image.

Also, the first color part and the second color part may have a filling part and a frame line part, respectively, and the filling part and the frame line part may have different chromas. Thereby, it is possible to superimposedly display the guide lines that can be more clearly recognized, without being swayed by the color tones of the captured image.

Meanwhile, in the above illustrative embodiment, the length of the period of the color alternation of the guide line 21 is always the same. However, the length may be appropriately changed.

For example, the higher the spatial frequency of the captured image, the length of the period may be more lengthened. Accordingly, even when the spatial frequency is high, it is possible to superimposedly display the guide lines that can be clearly recognized because the lengths of the first color part and second color part are long.

When the spatial frequency of the captured image is high, the image processing unit may not periodically alter the colors of the first color part and second color part. Thereby, when the spatial frequency is high, since the guide line is displayed as a uniform line, it is possible to superimposedly display the guide line that can be clearly recognized.

The image processing unit may display the guide line over a far side from a vehicle side, and the image processing unit may make the lengths of the first color part and second color part at the vehicle side shorter than those at the far side. The spatial frequency is generally high at the far side in the captured image. Accordingly, since the length of the period of the color alternation at the far side is lengthened, it is possible to superimposedly display the guide lines that can be clearly recognized.

The image processing unit may display the guide line over a far side from a vehicle side, and the image processing unit may make the lengths of the first color part and second color part at the vehicle side longer than lengths of the first color part and second color part at the far side. Thereby, since the length of the period of the color alternation at the far side is shortened, the driver can easily recognize the guide lines with a natural sense of perspective.

The first color part and the second color part adjacent to each other may have different hues, and the image processing unit may periodically alter and display the respective shadings of the first color part and second color part. Thereby, it is possible to superimposedly display the guide lines that can be more clearly recognized, without being swayed by the color tones of the captured image.

The image processing unit may display the guide line over a far side from a vehicle side and may make the brightness of the guide line at the vehicle side higher than the brightness of the guide line at the far side. Thereby, even when the brightness at the vehicle side is low, it is possible to superimposedly display the guide lines that can be more clearly recognized.

Meanwhile, in this illustrative embodiment, the vehicle driving assist device has the imaging unit. However, the vehicle driving assist device is not limited to the above. For example, the vehicle driving assist device may have an image acquisition unit that acquires a captured image of a surrounding area of the vehicle from an external device, instead of the imaging unit. That is, in another aspect of the present invention, a vehicle driving assist device that displays an image captured from a surrounding area of a vehicle on an in-vehicle monitor may include: an image acquisition unit that acquires an image captured from the surrounding area of the vehicle; and an image processing unit that displays a guide line with being superimposed on the captured image output from the image acquisition unit. The image processing unit displays so that a color of the guide line is periodically altered in a length direction thereof.

Even with the vehicle driving assist device, it is possible to superimposedly display the guide line that can be clearly recognized, without being swayed by the color tones or shapes of the captured image.

Also, in the above vehicle driving assist device, the guide line is displayed so that the color thereof is periodically altered in the length direction thereof. However, the color of the guide line may be changed, based on the hue or the brightness of the captured image area detected in the color attribute detection mean. That is, a vehicle driving assist device that displays an image captured from a surrounding area of a vehicle on an in-vehicle monitor may include: an imaging unit that is mounted on the vehicle and captures an image from a surrounding area of the vehicle; an image processing unit that displays a guide line with being superimposed on the captured image output from the imaging unit; and a color attribute detection unit that detects at least one of a hue and a brightness of the captured image area on which the guide line is superimposed. The image processing unit may compare the at least one of the hue and the brightness between the captured image area and the guide line, and when there is a part in which the at least one of the hue and the brightness are identical or approximate, the image processing unit may change a color of the guide line in the part in which the at least one of the hue and the brightness are identical or approximate.

Even with the vehicle driving assist device, it is possible to superimposedly display the guide line that can be clearly recognized, without being swayed by the color tones or shapes of the captured image.

The present invention has been specifically described with reference to the specific illustrative embodiment. However, it is apparent to one skilled in the art that a variety of changes and modifications can be made without departing the spirit and scope of the present invention.

The application is based on a Japanese Patent Application No. 2011-015807 filed on Jan. 27, 2011, the contents thereof being incorporated herein by reference.

DESCRIPTION OF THE REFERENCE NUMERALS

1: vehicle driving assist device
2: imaging optical system
3: imaging unit
4: memory
5: image processing unit
6: controller unit
7: input means
9: display means
20: captured image
21 to 23: guide line

The invention claimed is:

1. A vehicle driving assist device that displays an image captured from a surrounding area of a vehicle on an in-vehicle monitor, the device comprising:
    an imaging unit that is mounted on the vehicle and captures an image from a surrounding area of the vehicle, and
    an image processing unit that displays a guide line with being superimposed on the captured image output from the imaging unit,
    wherein the image processing unit displays the guide line so that a color thereof is altered in regular intervals in a length direction thereof,
    wherein the guide line has at least a first color part and a second color part, and
    wherein the first color part and the second color part are adjacent to each other in the length direction of the guide line.

2. The vehicle driving assist device according to claim 1, wherein hues of the first color part and the second color part adjacent to each other have a complementary color relation.

3. The vehicle driving assist device according to claim 1, wherein the first color part and the second color part adjacent to each other have the substantially same hue and have different shadings.

4. The vehicle driving assist device according to claim 1, wherein the first color part and the second color part have a filling part and a frame line part, respectively, and
    wherein the filling part and the frame line part have different chromas.

5. The vehicle driving assist device according to claim 1, wherein the image processing unit makes lengths of the first color part and the second color part longer as a spatial frequency of the captured image is higher.

6. The vehicle driving assist device according to claim 1, wherein the image processing unit is configured not to alter in regular intervals colors of the first color part and the second color part when a spatial frequency of the captured image is high.

7. The vehicle driving assist device according to claim 1, wherein the image processing unit displays the guide line over a far side from a vehicle side, and
    wherein the image processing unit makes lengths of the first color part and the second color part at the vehicle side shorter than lengths of the first color part and the second color part at the far side.

8. The vehicle driving assist device according to claim 1, wherein the image processing unit displays the guide line over a far side from a vehicle side, and
    wherein the image processing unit makes lengths of the first color part and the second color part at the vehicle side longer than lengths of the first color part and the second color part at the far side.

9. The vehicle driving assist device according to claim 1, wherein the first color part and the second color part adjacent to each other have different hues, and
    wherein the image processing unit displays so that shadings of the first color part and the second color part are altered in regular intervals, respectively.

10. The vehicle driving assist device according to claim 1, wherein the image processing unit displays the guide line over a far side from a vehicle side, and
    wherein the image processing unit makes a brightness of the guide line at the vehicle side higher than a brightness of the guide line at the far side.

11. The vehicle driving assist device according to claim 1, further comprising:
    a storage unit that stores a plurality of color-combination patterns configured by combinations of colors of the guide line,
    wherein the image processing unit comprises:
    a color-combination pattern selection unit that selects a color-combination pattern from the storage unit, and
    a color-combination pattern setting unit that sets, as a color-combination pattern of the guide line, the color-combination pattern selected in the color-combination pattern selection unit.

12. The vehicle driving assist device according to claim 1, wherein the image processing unit comprises:
    a brightness selection unit that selects a brightness of the guide line, and a brightness setting unit that sets, as a brightness of the guide line, the brightness selected in the brightness selection unit.

13. The vehicle driving assist device according to claim 1, wherein the image processing unit comprises:
a color attribute detection unit that detects at least one of a hue and a brightness of the captured image area on which the guide line is superimposed, and
a color-combination pattern setting unit or a brightness setting unit that compares the at least one of the hue and the brightness between the captured image area and the guide line, and when there is a part in which the at least one of the hue and the brightness are identical or similar, changes at least one of the color-combination pattern of the guide line and the brightness of the guide line in the part in which the at least one of the hue and the brightness are identical or similar.

14. A vehicle driving assist device that displays an image captured from a surrounding area of a vehicle on an in-vehicle monitor, the device comprising:
an image acquisition unit that acquires an image captured from the surrounding area of the vehicle, and
an image processing unit that displays a guide line with being superimposed on the captured image output from the imaging unit,
wherein the image processing unit displays so that a color of the guide line is altered in regular intervals in a length direction thereof,
wherein the guide line has at least a first color part and a second color part, and
wherein the first color part and the second color part are adjacent to each other in the length direction of the guide line.

15. A vehicle driving assist device that displays an image captured from a surrounding area of a vehicle on an in-vehicle monitor, the device comprising:
an imaging unit that is mounted on the vehicle and captures an image from a surrounding area of the vehicle;
an image processing unit that displays a guide line with being superimposed on the captured image output from the imaging unit, and
a color attribute detection unit that detects at least one of a hue and a brightness of the captured image area on which the guide line is superimposed,
wherein the image processing unit compares the at least one of the hue and the brightness between the captured image area and the guide line, and when there is a part in which the at least one of the hue and the brightness are identical or similar, the image processing unit changes a color of the guide line in the part in which the at least one of the hue and the brightness are identical or similar,
wherein the image processing unit displays so that the color of the guide line is altered in regular intervals in a length direction thereof,
wherein the guide line has at least a first color part and a second color part, and
wherein the first color part and the second color part are adjacent to each other in the length direction of the guide line.

* * * * *